United States Patent
Turk

(10) Patent No.: US 8,583,810 B2
(45) Date of Patent: Nov. 12, 2013

(54) SESSION AFFINITY CACHE AND MANAGER

(75) Inventor: Mladen Turk, Zagreb (HR)

(73) Assignee: Red Hat, Inc., Raleigh, NC (US)

( * ) Notice: Subject to any disclaimer, the term of this patent is extended or adjusted under 35 U.S.C. 154(b) by 957 days.

(21) Appl. No.: 11/969,806

(22) Filed: Jan. 4, 2008

(65) Prior Publication Data
US 2009/0177778 A1 Jul. 9, 2009

(51) Int. Cl.
*G06F 15/16* (2006.01)

(52) U.S. Cl.
USPC .............................. 709/229; 79/227

(58) Field of Classification Search
None
See application file for complete search history.

(56) References Cited

U.S. PATENT DOCUMENTS

| | | | |
|---|---|---|---|
| 7,254,634 B1 * | 8/2007 | Davis et al. | 709/228 |
| 7,296,076 B1 * | 11/2007 | Portolani | 709/227 |
| 2002/0046281 A1 * | 4/2002 | Cope | 709/227 |
| 2002/0051541 A1 * | 5/2002 | Glick et al. | 380/258 |
| 2002/0129149 A1 * | 9/2002 | Schulz | 709/226 |
| 2002/0161839 A1 * | 10/2002 | Colasurdo et al. | 709/204 |
| 2003/0037108 A1 * | 2/2003 | Peiffer et al. | 709/203 |
| 2003/0053420 A1 * | 3/2003 | Duckett et al. | 370/252 |
| 2005/0108574 A1 * | 5/2005 | Haenel et al. | 713/201 |
| 2006/0059125 A1 * | 3/2006 | Yan | 707/3 |
| 2007/0266149 A1 * | 11/2007 | Cobb et al. | 709/224 |
| 2008/0034424 A1 * | 2/2008 | Overcash et al. | 726/22 |
| 2008/0285464 A1 * | 11/2008 | Katzir | 370/241 |
| 2011/0022707 A1 * | 1/2011 | Bansal et al. | 709/224 |

* cited by examiner

*Primary Examiner* — Karen Tang
(74) *Attorney, Agent, or Firm* — Lowenstein Sandler LLP

(57) ABSTRACT

A method and apparatus for managing sessions by a load balancer using a session affinity cache to manage common session identifiers and resource node session identifiers. A session affinity manager within the load balancer utilizes a common session identifier to represent multiple sessions to a client. The session affinity manager provided generates a common session identifier for a set of resource node sessions for each client. The relationship between the resource node session identifiers and common session identifier is maintained in the session affinity cache by the session affinity manager. The session affinity manager translates client requests using the common session identifier into requests using the resource node session identifier retrieved from the session affinity cache. The session affinity manager rewrites resource node responses to use a common session identifier in place of resource node session identifiers.

17 Claims, 7 Drawing Sheets

| Common Session ID | Resource Node Session ID | Resource Node | URI |
|---|---|---|---|
| CCCC | JSESSIONID=XXXX | Server 1 | /foo/bar |
| | JSESSIONID=YYYY | Server 2 | /foo/baz |
| | JSESSIONID=ZZZZ | Server N | /foo/ban |

(401, 403, 405, 407, 409)

SESSION AFFINITY CACHE AND MANAGER

TECHNICAL FIELD

Embodiments of the present invention relate to management of sessions between clients and servers. Specifically, the embodiments relate to a method and apparatus for a load balancer to match requests from a client with resources provided by different servers by using a common session identifier.

BACKGROUND

A standard load balancing and session management scenario is illustrated in FIG. 1. A client computer 101 requests data provided by a resource that is made available through a group of servers 107A-C. The requested data can be available on any subset of the group of servers 107A-C. In the illustrated example, the servers provide web based resources such as web pages, images referenced by the web pages, and other content embedded in the web pages. Requests for data from the client computer 101 are initially handled by a web server 103.

The web server 103 analyzes an incoming request from the client computer 101. The request includes a uniform resource locator (URL) that identifies the requested resource, such as a web page. The web server 103 analyzes the URL and determines the documents and/or other content that is required to service the request. The requested documents and/or other content are provided by the servers 107A-C. The web server 103 forwards or generates a set of requests to the server 107A-C to obtain the documents and/or other content necessary for responding to the client's request.

Access to the servers 107A-C is controlled by a load balancing server 105. The load balancing server 105 receives requests from the web server 103 and determines which of the available servers 107A-C will provide the requested data. Once one of the servers 107A-C is selected by the load balancing server 105, then the selected server prepares a response to the data request and sets up a session between the client and the server. A session establishes a relationship between a client and a server such that a state of the session can be tracked, thereby enabling the client 101 to continue to communicate with the same server and for more complex operations to be performed, such as access to account information after a session is established through a log-in procedure.

Sessions are often established with a client 101 through the use of a cookie. A cookie is a small file stored on the client computer 101 that includes session identification information for a particular web page or web site. The cookie can include a session affinity mark with the session identifier. The session affinity mark indicates the particular server that is servicing a session so that the session information does not have to be stored by each of the servers that could possibly service a session. A client 101 that requires further data includes the session identifier and session affinity mark in its request. The load balancing server 105 uses the session affinity mark to direct the incoming request to the proper server 107A-C. However, some client security arrangements do not allow for the storage of cookies on the client computer 101 and the use of session affinity marks can become unstable and an may not be supported or otherwise available under certain circumstances.

If cookies are not allowed or supported at the client, the servers 107A-C generate a URL with the session information appended thereto or within the web page in the form <URL>; session_id[?query]. However, web pages that include embedded content that is provided by separate servers 107A-C are not supported. For example, one server 107A can provide the web page, while other servers 107B, C provide an image and table, respectively, for that web page. This results in an unstable system, because multiple servers having the same session name can have different identifiers that are not present across all of the servers 107A-C. Also, it is not possible to have mixed servers 107A-C from different application server vendors, because the session identifier creation and maintenance is application vendor specific.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
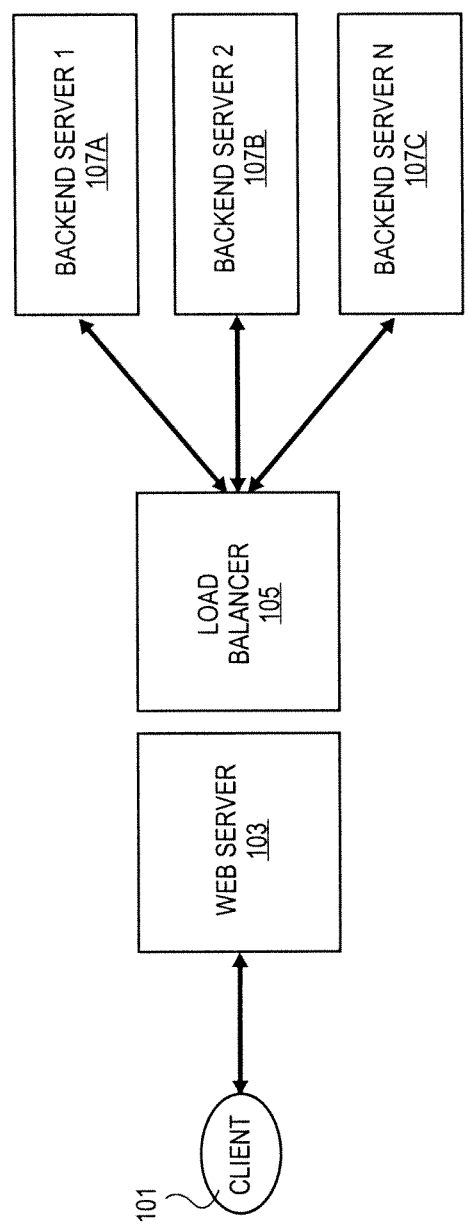
FIG. 1 is a diagram of a system for servicing resource requests.

Described herein is a method and apparatus for managing sessions by a load balancer using a session affinity cache to manage common session identifiers and resource node session identifiers. This system enables different resource node session identifiers with the same session name to be handled without causing session exceptions. A session affinity manager with the load balancer utilizes a common session identifier to represent multiple sessions to a client. The session affinity manager generates a common session identifier for a set of related resource node sessions. The relationship between the resource node session identifiers and common session identifier is maintained in the session affinity cache by the session affinity manager. The session affinity manager translates client requests using the common session identifier into requests using the resource node session identifier retrieved from the session affinity cache. The session affinity manager rewrites resource node responses to use common session identifier in place of resource node session identifiers.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be born in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "generating," "determining," "selecting," "displaying," "searching," "receiving," "updating," "modifying," "assigning," "requesting," "forwarding," "adding," "rewriting" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer readable medium includes any mechanism for storing information in a form readable by a computer. For example, a computer readable medium includes read only memory ("ROM"), random access memory ("RAM"), magnetic disk storage media; optical storage media, flash memory devices or other type of machine-accessible storage media.

Figure 2:
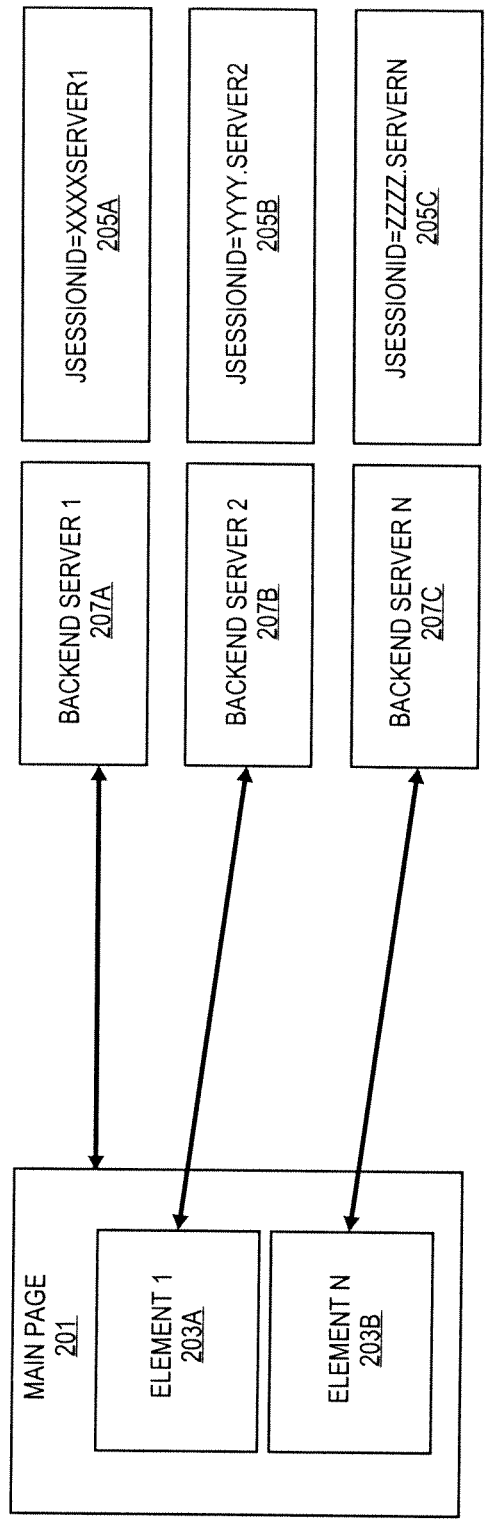
FIG. 2 is a diagram of a resource provided by multiple servers.

FIG. 2 is a diagram of a resource provided by multiple servers. The diagram illustrates a common scenario that would cause an unstable situation, but that the session affinity cache and session affinity management system can handle. A web server or similar resource provider may offer a web page 201 that includes several elements 203A, B. The web page and elements 203A, B are retrieved by the web server from a set of resource nodes. A 'set,' as used herein, refers to any positive whole number of items including one item. A resource node is any program or hardware device that provides access to a resource such as files in a file system, tables and entries in a database system and similar resources.

When a client requests this web page 201, the page itself is retrieved by the web server from a first resource node 207A ("backend server 1"). A session is established between the client and the resource node providing the web page. The session is assigned an identifier such as JSESSIONID=XXXX. The session identifier has a format of Name=Value, where the name is defined by the application vendor's specification and the value is determined by the application implementation. Example names for different applications include JSESSIONID for Java Servlets, PHPSESSIONID for PHP, and ASPSESSIONID for Active Server Pages. If multiple resource nodes are utilized to provide the web page and its constituent elements, these resource nodes do not coordinate to assign unique values to the session identifier. As a result, non-unique identifiers can be utilized that can cause conflicts and errors. If a client allows cookies, then a session affinity mark (e.g., *.SERVER1;*.SERVER2; *.SERVER3) can be appended to the session identifier to indicate the specific resource node participating in the session. However, this is not possible where cookies are not allowed due to client security settings.

In the example scenario, the first resource node 207A can append the session affinity mark "*.SERVER1" to the session identifier. A second resource node 207B ("backend server 2") provides the first element 203A of the web page and generates a separate session with the client labeled "JSESSIONID=YYYY.SERVER2." The second element 203 is provided by a third resource node 207C ("backend server N") that generates another separate session with the client labeled "JSESSIONID=ZZZZ.SERVERN."

In situations where the client does not permit the use of cookies, then the session identifier is placed into the URL. However, it may not be possible to include a session affinity mark or the client may not be able to track multiple session affinity marks using this method. As a result session exceptions and errors can occur.

Figure 3:
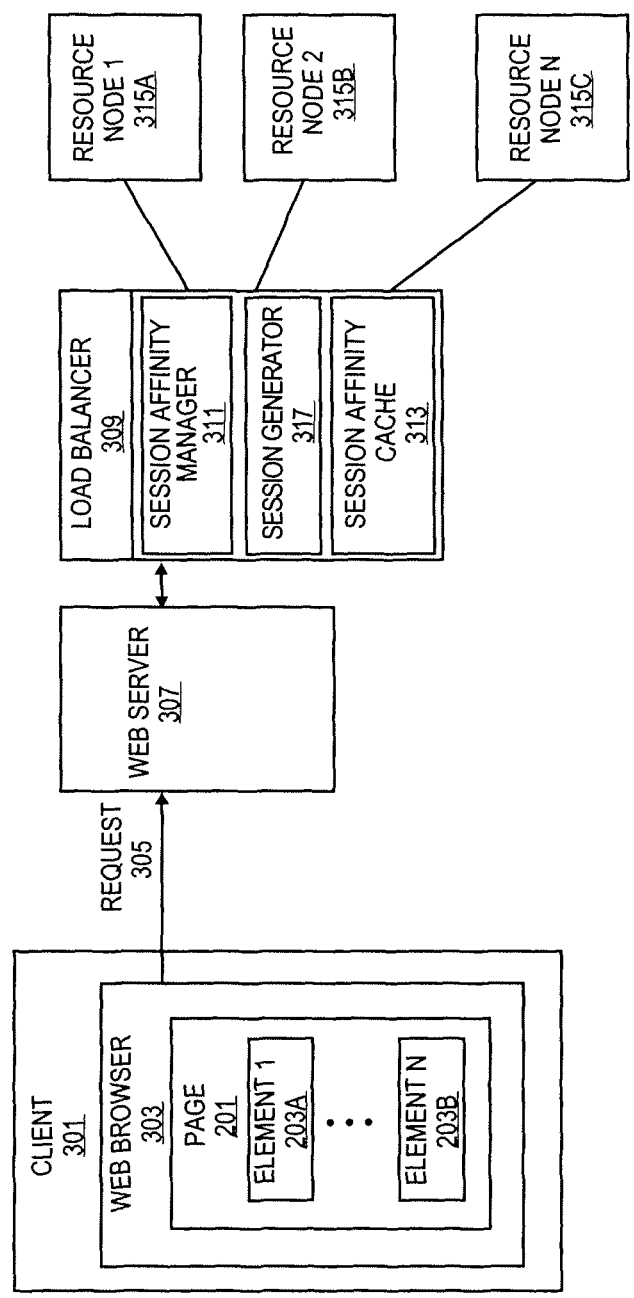
FIG. 3 is a diagram of a system for servicing resource requests using a common session identifier.

FIG. 3 is a diagram of a system for servicing resource requests using a common session identifier. In one embodiment, the session affinity cache and management system services a client 301 that is executing a web browser 303 or similar application to access a resource such as a web page 201 that includes a number of component elements 203A, B. The client 301 requests 305 these resources from a web server 307. The web server 307 determines the identity of the requested resources and manages communication with the client 301. The web server 307 passes the request or generates new requests that are passed to a load balancer 309 that selects one of a number of available resource nodes 315A-C to provide the requested data. The load balancer 309 utilizes a session affinity cache 313 and session affinity manager 311 to track the servers 315A-C that have already established sessions with the client.

A client 301 can be any type of computer capable of executing a web browser or similar application. The client 301 can be a desktop computer, laptop computer, workstation, console device, hand held device, smart phone, or similar computing device. The application, such as the web browser 303, that is requesting resources can be any type of application that establishes sessions with remote servers to access a data collection where the data collection is addressed by a uniform resource locator (URL) or similar address or identifier. In the example embodiment, a web browser 303 accessing a web page 201 is discussed for sake of clarity. One skilled in the art would understand that the principles discussed in relation to this example embodiment are applicable to other applications with analogous components and resources.

The web page 201 includes several elements 203A, B. The client 301, upon receiving the web page 201 from a first resource node over a first session, requests the additional elements 203A, B from the web server 307 to complete the web page 201 and prepare it for display to the user of the client 301. Each of the additional elements 203A, B may be provided by a separate resource node. Each resource node then establishes a separate session with the client 301 and web browser 303 to provide the requested elements 203A, B.

Requests 305 to the web server 307 can be made through any type of communication protocol. The communication protocol for communicating between the web browser 303 and the web server 307 can be the hypertext transfer protocol (HTTP) or similar protocol. The communication can be secured or unsecured. The client 301 and web browser 307 can communicate over any networking system including a local area network (LAN), a wide area network (WAN) such as the Internet, or similar network.

The web server 307 can be any type of web server including an Apache HTTP Server by the Apache Software Foundation of Forest Hill, Md., an Internet Information Service (IIS) server by Microsoft of Redmond, Wash. or similar web server applications. The web server 307 works in conjunction with a load balancer 309 and set of resource nodes 315A-C to generate responses to HTTP requests.

The load balancer 309 receives requests from the web server 307 and determines which of the available resource nodes 315A-C will service the request. The load balancer 309 can utilize any load balancing algorithm including a round robin based scheme, a data throughput monitoring scheme, a busyness monitoring scheme or similar algorithms to select a resource node to service the request. The load balancer 309 interacts with a session affinity manager 311 to track session identifiers. A resource node 315A-C can start a session with a client in response to being selected to service a request. In another embodiment, a session generator 317 component interacts with the session affinity manager to establish sessions between a client 301 and resource node 315A-C.

In an embodiment without a session generator, the session affinity manager 311 analyzes the response from the resource node to determine the session identifier and record the session identifier in the session affinity cache 313. In an embodiment, with the session generator 317, the session generator 317 determines a resource node session identifier based on the selection of the resource node by the load balancer 309. The resource node session identifier is then provided to the selected resource node with the request to be serviced.

The session affinity manager 311 also generates a common session identifier for each client 301 requesting data to be accessed from any number of resource nodes 315A-C. When a response is received from a resource node, the session affinity manager 311 replaces the session identifier with the common session identifier. When a request is received from the web server 307 and load balancer 309 for an existing session, the common session identifier is replaced with the session identifier specific to the servicing resource node, i.e., the resource node session identifier.

The session affinity cache 313 stores the relationships between the common session identifiers and the resource node specific session identifiers. The session affinity manager performs look ups when performing translations and rewrites of requests and responses on the session affinity cache 313 to retrieve the information needed for translating or rewriting the requests and responses. The session affinity cache 313 can be implemented as a hardware cache or may be implemented as a software program utilizing system memory or similar general purpose memory. The session affinity cache 313 may perform cache entry replacement or may work in conjunction with the session affinity manager 311 to manage the cache through a cache replacement scheme.

In one embodiment, the session affinity manager 311, session generator 317 and session affinity cache 313 can be components of a load balancer 309 system or similar system, where the load balancer 309 system is a separate computing device such as a server machine or similar computing device. In other embodiments, these components as well as the load balancer can be components of the web server 307, where the web server 307 is a computing device such as a server machine. In further embodiments, any combination of the load balancer 309, session affinity manager 311, session generator 317 and session affinity cache can be implemented as components or sub-components of the other components. Each of these components can be implemented as discrete or integrated hardware devices or as software components or sub-components.

The resource nodes 315A-C can be any type of resource servers including file system managers, database management systems and similar systems. The resource nodes 315A-C can each be executed on separate hardware devices such as servers, desktops, laptops or similar devices. In another embodiment, any number of the resource nodes 315A-C may be applications that execute within the same application server and on the same hardware device.

Figures 4, 5A, 5B:
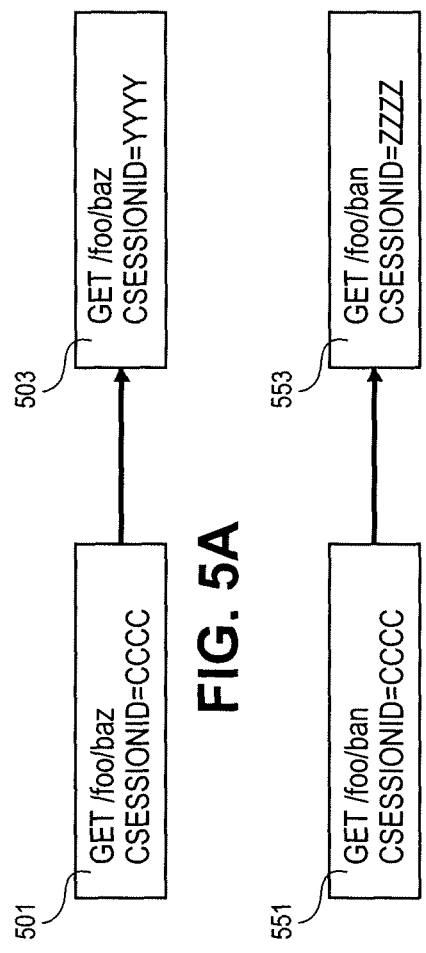
FIG. 4 is a diagram of one embodiment of a cache for managing session affinity requests.
FIG. 5A is a diagram of one embodiment of a transformation of a request using a common session identifier to a specific session identifier.
FIG. 5B is a diagram of one embodiment of a transformation of a request using a common session identifier to a specific session identifier.

FIG. 4 is a diagram of one embodiment of a cache for managing session affinity requests. The diagram illustrates an example table format of the session affinity cache. The example illustrated shows a single entry for sake of clarity. A cache can be configured to hold any number of entries. The session affinity cache includes at least four fields for each common session entry. The four fields include a common session identifier field 401, a resource node session identifier 403, a resource node identifier 405 and a uniform resource identifier (URI) 407. In other embodiments, additional data can be stored in the session affinity cache including client information, connection type information, web server information, load balancer information, server application type or similar data.

The common session identifier 401 is generated by the session affinity manager in response to the creation of a new entry in the session affinity cache. A new entry is created by the session affinity manager when a request is sent to a resource node and there is no common session identifier or no matching common session identifier. At the time of creation only some of the fields may be updated. A common session identifier 401 can be stored with the resource node identifier 405 and URI 407. When a response is received with a resource node session identifier, then the resource node session identifier field 403 is updated. The resource node session identifier field 403 can also be updated based on data provided by a session generator.

The common session identifier 401 is shared by all sessions of a particular client. In another embodiment, the common session identifier 401 is shared by all sessions of a particular application of the client. The common session identifier 401 is used to identify all sessions in communication between the web server and the client. The common session identifier 401 is replaced in these communications as they pass between the load balancer and the resource nodes. The common session identifier is replaced by the session affinity manager with the appropriate resource node session identifier 403.

The resource node session identifier 403 is generated by the resource node or session generator in response to an initial resource request. The resource node session identifier 403 is generated based on the type of application that the resource node is executing. For example, a Java Servlet will generate a resource node session identifier 403 of the format JSESSIONID=VALUE where VALUE will be specific to the executing instance of the Java Servlet.

The resource node identifier 405 can be data of any type or format for identifying a server. The resource node identifier 405 can be a server name specified by an administrator, a network address, a name or address of a server application or similar identifier. The resource node identifier 405 can be used to forward requests from the web server to the appropriate resource node.

A URI 407 is an identifier received from a client request. The URI can have any format or type including that of a URL or a sub-section of a URL. For example, the URI can have a file system format with '/' delimiting directories and file names. In the illustrated example, a URI '/foo/bar' is requesting a resource that is named 'bar' in a directory named 'foo.' A URI can have any size and the format can vary between servers. For example, one server may be a file system manager and utilize a standard file system directory structure. Another server may be a database management system and utilize a query structure.

FIG. 5A is a diagram of one embodiment of a transformation of a request from a common session identifier to a specific resource node session identifier. A request from a client can be in any format that indicates a resource and a common session identifier. For example, an HTTP request may be a 'Get' specifying a URI '/foo/baz' and a common session identifier 'CCCC.'

The session affinity manager receives the request and performs a look up in the session affinity cache using the common session identifier and the URI. The resource node session identifier associated with the common session identifier and the URI is retrieved from the look up and utilized to replace the common session identifier in the request to create a modified request 503. The modified request is then forwarded to the server associated with the common session identifier and URI. The server information is also retrieved during the session affinity cache look up for use in forwarding the request.

Figure 6:
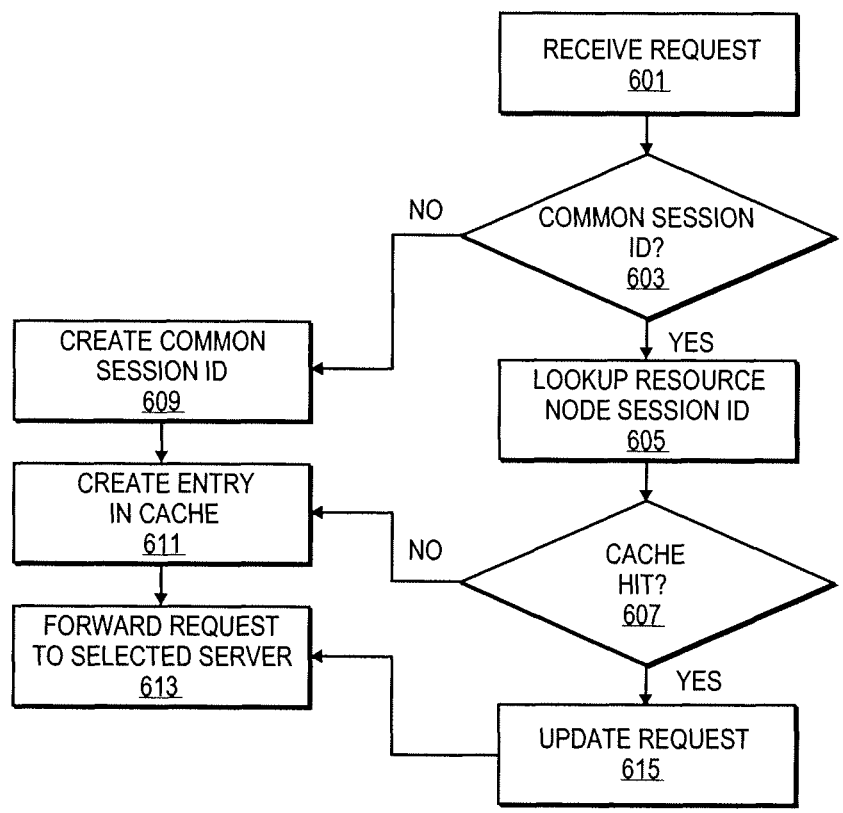
FIG. 6 is a flowchart of one embodiment of a process for processing requests.

FIG. 5B is a diagram of one embodiment of a transformation of a request using a common session identifier to a specific resource node session identifier. The process described in regard to FIG. 5A and FIG. 6 is applied to the request 551 by the session affinity manager using the results of the look up operation using the session affinity cache of FIG. 4. This process generates the modified request 553. The modified request replaces the same common session identifier with a separate resource node session identifier specific to the URI and common session identifier of the request 551 received from the client.

FIG. 6 is a flowchart of one embodiment of a process for processing requests. This process can be performed by a session affinity manager. The process can be initiated in response to receiving a request from a client. The request can be passed on to the session affinity manager via the load balancer by the web server or directly to the session affinity manager by the web server. In one embodiment, the load balancer determines if the request is a new request or a request associated with an existing session. If the request is new, then the load balancer selects an available resource node to service the request. In another embodiment, the analysis of the request is performed by the session affinity manager and the load balancer is called if needed by the session affinity manager.

The illustrated process is analogous for both of these embodiments, however, different components execute the process at different stages in certain embodiments. For sake of clarity, an embodiment where the request is received by the session affinity manager from the web server (block 601) is described.

The session affinity manager analyzes the incoming request to determine if it has a valid common session identifier (block 603). If no common session identifier is present in the received request or a look up of the common session identifier in the received request results in a cache miss, then a common session identifier is created (block 609). The session affinity manager can use any system or format for creating common session identifiers. The common session identifier can resemble other types session identifiers, such that clients can recognize the session identifier and utilize it for further requests.

The new common session identifier is then used to create a new entry in the session affinity cache (block 611). The entry in the cache includes the common session identifier, the resource node identifier, resource node session identifier and the URI. The session affinity manager can call or otherwise interact with the load balancer, if necessary to determine the resource node to service the received request. In embodiments, where the load balancer handles the request before the session affinity manager, the load balancer can provide this information with the request. The session affinity manager can obtain the resource node session identifier from a session generator. The resource node session identifier may not yet be known and can be obtained from the response by the resource node to the request, in embodiments where a session generator is not present.

The request can then be forwarded to the selected resource node to be serviced and for the resource node to initiate a session with the client. In other embodiments, the resource node may be selected before or after processing by the session affinity manager has completed. For example, the load balancer may select a resource node to service the request after the session affinity manager has created an entry, in which case, the resource node and resource node session identifiers are obtained from the response to the request or directly from the load balancer and resource nodes.

If the received request does include a valid common session identifier, then the session affinity manager performs a look up in the session affinity cache using the common session identifier and the URI derived from the request (block 607). A check is made to see if the combination of the common session identifier and the URI is present in the cache (block 607). If the combination is present, then the resource node session identifier is retrieved. The resource node session identifier is then used to update the request by replacing the common session identifier with the resource node session identifier (block 615). The modified request is then forwarded to the server associated with the resource node session identifier (block 613).

If the common session identifier and URI combination is not present in the cache, then a cache miss occurs. This case can result when a common session identifier has been established for a client, but a different resource is being requested that is provided by a different resource node. The entry for the common session identifier is modified with an additional session or a new entry with the same common session identifier is created dependent on the structure and management of the cache (block 611).

The request is then forwarded to the resource node to be serviced (block 613). In one embodiment, the resource node can be selected by the load balancer using standard load balancing schemes. In another embodiment, the load balancer may utilize data in the session affinity cache or the session affinity manager may provide information from the session affinity cache on entries with similar URIs. A resource node providing data with similar URIs to the requested data is likely to provide the requested data and to have recently accessed this data. This information can be utilized to select the same server and improve the performance of the system with quicker response times.

Figure 7:
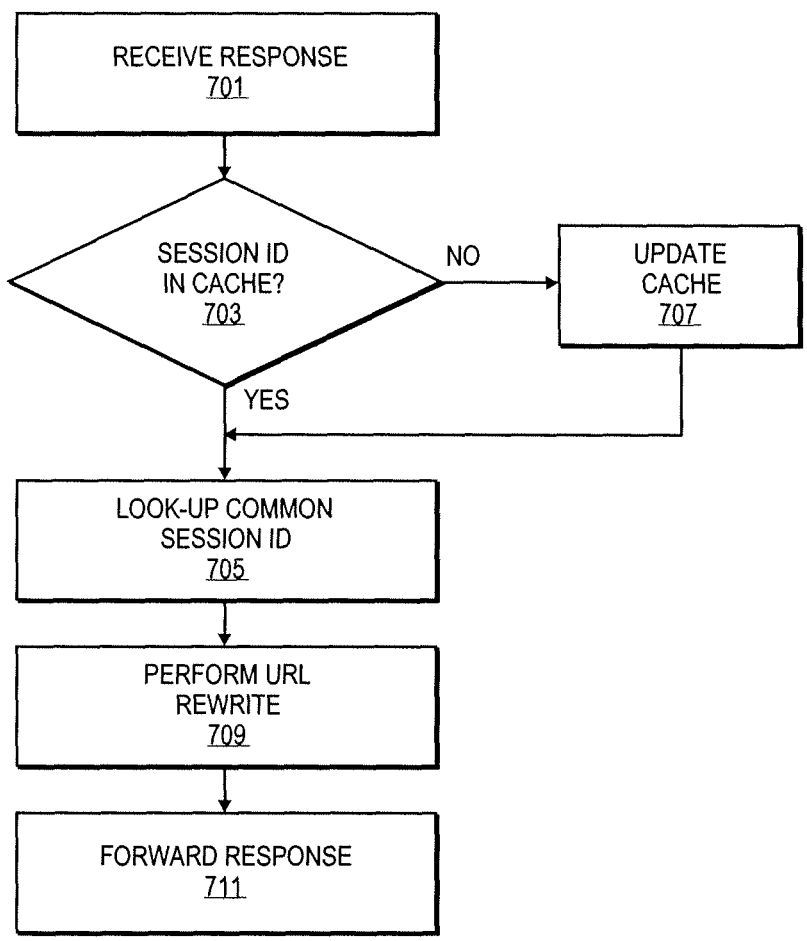
FIG. 7 is a flowchart of one embodiment of a process for handling responses.

FIG. 7 is a flowchart of one embodiment of a process for handling responses from the resource nodes. The illustrated process can be initiated upon receipt of the resource node response to the request by the session affinity manager (block 701). The response will include at least one resource node session identifier. The session affinity manager checks the resource node session identifier against the session affinity cache (block 703). If the resource node session identifier is not present in the session affinity cache, then the session affinity manager updates an entry associated with the requesting client, URI and resource node and adds the resource node session identifier to that entry (block 707).

If the resource node session identifier is present in the session affinity cache or after it is added to the cache, a common session identifier is retrieved from the session affinity cache (block 705). The common session identifier with an entry having a matching URI, resource node identifier and resource node session identifier is retrieved.

The session affinity manager parses the response from the resource node to identifier data to be modified therein. Each resource node session identifier and each URL or similar identifier in the response is then rewritten using the common session identifier in place of the resource node session identifier (block 709). A response can have any number of items that must be rewritten. Each item can also be associated with a separate resource node or resource node identifier. However, each such data item to be modified should be associated with the same common session identifier. The modified response is then forwarded to the web server to be transmitted to the client (block 711).

Figure 8:
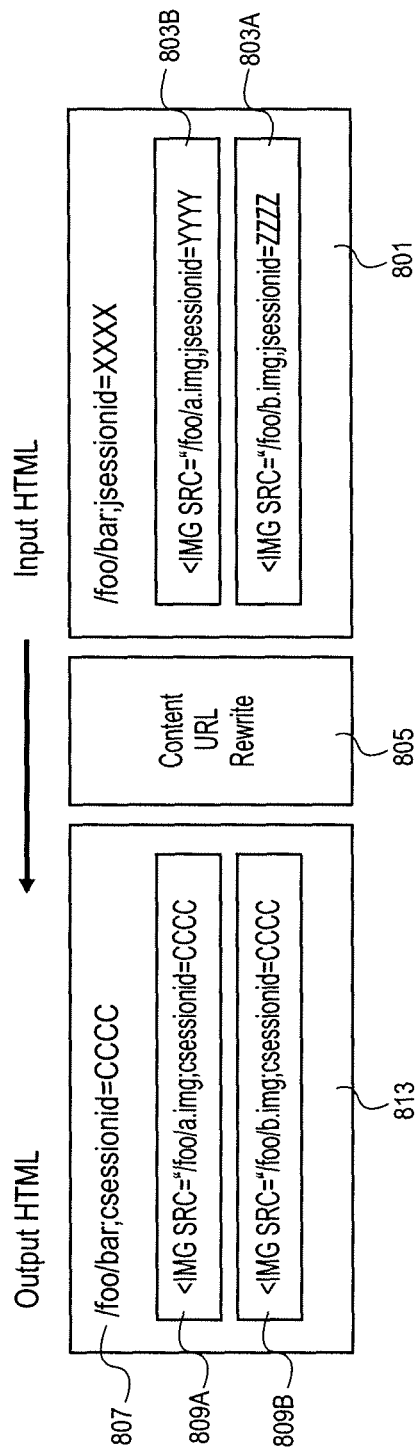
FIG. 8 is a flowchart of one embodiment of a process for rewriting uniform resource locators using a common session identifier.

FIG. 8 is a flowchart of one embodiment of a process for rewriting uniform resource locators using a common session identifier. In this example, a resource node is responding to a request by providing a hypertext markup language document (HTML) 801. The document 801 has a URL 811 associated with it and also includes URLs for embedded content 803A, B. This document is received by the session affinity manager or similar component that performs a content URL rewrite 805 on the response.

The content URL rewrite component 805 looks up each URL and resource node session identifier in the received document in the session affinity cache as described in regard to FIG. 7. Each URL is then re-written to replace the resource node session identifier with a common session identifier.

A modified response document 813 is generated including a modified URL 807 for the document and modified URLs for each embedded content item 809A, B. The modified document 813 is then sent to the requesting client. The requesting client will then use the re-written URLs that incorporate the common session identifier when making request for the embedded content.

Thus, a method and apparatus managing session data through a session affinity manager and session affinity cache has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A computer-implemented method comprising:
receiving a request for a resource, the request comprising a common session identifier and a resource identifier;
determining a resource node session identifier from an entry in a session affinity cache based on a combination of the common session identifier and the resource identifier, the session affinity cache comprising a plurality of entries with at least four fields for each of the plurality of entries, the at least four fields comprising a common session identifier field, a resource node session identifier field, a resource identifier field, and a uniform resource identifier field, wherein the common session identifier is associated with a plurality of resource node session identifiers, each of the plurality of resource node session identifiers having a single name and value pair, and wherein each of the plurality of resource node session identifiers is associated with a separate resource node;
replacing the common session identifier in the request with the determined resource node session identifier; and
forwarding the request to a resource node associated with the requested resource using the determined resource node session identifier.

2. The computer-implemented method of claim 1, further comprising:
generating a new common session identifier between a client sending the request and the resource node, if the common session identifier is not found in a session affinity cache.

3. The computer-implemented method of claim 1, further comprising:
adding a common session identifier entry to a session affinity cache, if the common session identifier is not found in the session affinity cache.

4. The computer-implemented method of claim 1, further comprising:
forwarding the request to a load balancer to select a resource node to service the request, if the common session identifier and resource identifier are not found in the session affinity cache.

5. The computer-implemented method of claim 4, further comprising:
updating the session affinity cache to add the resource node session identifier to a common session identifier entry for the request in the session affinity cache upon receipt from a load balancer or resource node.

6. The computer-implemented method of claim 1, further comprising:
rewriting the resource node session identifier to the common session identifier in a response from the resource node to the client.

7. The computer-implemented method of claim 1, wherein each of the resource nodes is provided by a different vendor.

8. A non-transitory computer readable medium, having instructions stored therein, which when executed, cause a processing device to perform a set of operations comprising:
    receiving a request for a resource, the request comprising a common session identifier and a resource identifier;
    determining a resource node session identifier from an entry in a session affinity cache based on a combination of the common session identifier and the resource identifier, the session affinity cache comprising a plurality of entries with at least four fields for each of the plurality of entries, the at least four fields comprising a common session identifier field, a resource node session identifier field, a resource identifier field, and a uniform resource identifier field, wherein the common session identifier is associated with a plurality of resource node session identifiers, each of the plurality of resource node session identifiers having a single name and value pair, and wherein each of the plurality of resource node session identifiers is associated with a separate resource node;
    replacing the common session identifier in the request with the determined resource node session identifier; and
    forwarding the request to a resource node associated with the requested resource using the determined resource node session identifier.

9. The non-transitory computer readable medium of claim 6, having further instructions therein, which when executed, cause the computer to perform a further set of operations, further comprising:
    generating a new common session identifier between a client sending the request and the resource node, if the common session identifier is not found in a session affinity cache.

10. The non-transitory computer readable medium of claim 8, having further instructions therein, which when executed, cause the computer to perform a further set of operations, further comprising:
    adding a common session identifier entry to a session affinity cache, if the common session identifier is not found in the session affinity cache.

11. The non-transitory computer readable medium of claim 8, having further instructions therein, which when executed, cause the computer to perform a further set of operations, further comprising:
    forwarding the request to a load balancer to select a resource node to service the request, if the common session identifier and resource identifier are not found in the session affinity cache.

12. The non-transitory computer readable medium of claim 11, having further instructions therein, which when executed, cause the computer to perform a further set of operations, further comprising:
    updating the session affinity cache to add the resource node session identifier to a common session identifier entry for the request in the session affinity cache upon receipt from a load balancer or resource node.

13. The non-transitory computer readable medium of claim 8, having further instructions stored therein, which when executed perform a set of operations, further comprising:
    rewriting the resource node session identifier to the common session identifier in a response from the resource node to the client.

14. The non-transitory computer readable medium of claim 8, wherein each of the plurality of resource nodes is provided by a different vendor.

15. A system comprising:
    a session affinity manager executable by a computer system, the session affinity manager to track a relationship between a common session identifier and a plurality of resource node session identifiers, each of the plurality of resource node session identifiers having a single name and value pair, wherein each of the plurality of resource node session identifiers is associated with a separate resource node; and
    a session affinity cache coupled to the session affinity manager, the session affinity cache to store an entry comprising a combination of the common session identifier, the session affinity cache comprising a plurality of entries with at least four fields for each of the plurality of entries, the at least four fields comprising a common session identifier field, a resource node session identifier field, a resource identifier field, and a uniform resource identifier field, the plurality of resource node session identifiers and a plurality of resource identifiers,
    wherein the session affinity manager is configured to modify a request for a resource by replacing the common session identifier in the request with a resource node session identifier corresponding to the resource.

16. The system of claim 15, further comprising:
    a load balancer coupled to the session affinity manager and to one of a plurality of resource nodes, the load balancer to service a request from a client.

17. The system of claim 15, wherein the session affinity manager comprises a session generator to establish a session for a request.

* * * * *

UNITED STATES PATENT AND TRADEMARK OFFICE
CERTIFICATE OF CORRECTION

| | | |
|---|---|---|
| PATENT NO. | : 8,583,810 B2 | Page 1 of 1 |
| APPLICATION NO. | : 11/969806 | |
| DATED | : November 12, 2013 | |
| INVENTOR(S) | : Mladen Turk | |

It is certified that error appears in the above-identified patent and that said Letters Patent is hereby corrected as shown below:

In the Claims

In claim 9, column 11, line 27, delete "6" and insert --8--.

Signed and Sealed this
Eleventh Day of March, 2014

Michelle K. Lee
*Deputy Director of the United States Patent and Trademark Office*